Patented May 30, 1944

2,350,147

UNITED STATES PATENT OFFICE 2,350,147

TERPENE ETHER

Joseph N. Borglin, Wilmington, Del., assignor to Hercules Powder Company, Wilmington, Del., a corporation of Delaware No Drawing. Application July 29, 1942,
Serial No. 452,798

19 Claims. (Cl. 260—611)

This invention relates to a method for the production of terpene ethers. More particularly it relates to a method for the production of terpene ethers by the addition of an alcohol at a double bond of an unsaturated terpene compound under the catalytic action of sulfamic acid.

The ethyl ether of camphene has been produced heretofore by the reaction of ethyl alcohol with the complex cyclic terpene camphene in the presence of sulfuric acid as a catalyst. Thus, Semmler (Ber. 33, pp. 3420-32) produced such a compound by boiling a mixture of camphene, ethyl alcohol, and sulfuric acid under reflux for several hours. I. W. Humphrey in U. S. Patent 2,136,011 found that organic sulfonic acids were superior to sulfuric acid as catalysts for the addition of an alcohol at a double bond of an unsaturated terpene compound.

Now in accordance with this invention it has been found that sulfamic acid acts to catalyze the formation of terpene ethers by the addition of an alcohol at a double bond of an unsaturated terpene compound in a manner superior to the manner in which sulfuric acid and organic sulfonic acid operate.

The method in accordance with this invention comprises reacting an unsaturated terpene compound with an alcohol in the presence of sulfamic acid. The reaction produced by this method appears to involve the addition of the acid catalyst to a double bond of the unsaturated terpene, to produce an unstable intermediate compound which reacts with the alcohol to produce a terpene ether.

The method in accordance with this invention is illustrated by the following specific examples, all parts being by weight unless otherwise specified:

Example I

One hundred parts of alpha-pinene, two hundred parts of methanol, and ten parts of sulfamic acid were refluxed at 75° C. for thirty hours. The reaction mixture was then washed with water to remove unreacted methanol and any sulfamic acid which might have dissolved. Analysis of the reaction product indicated a methoxyl content of 14.2%, or an equivalent of 77.8% terpene ethers.

Example II

The conditions set forth in Example I were duplicated except that 200 parts of ethanol were used in place of the 200 parts of methanol. Analysis of the reaction product showed an ethoxyl content of 13.1%, or a terpene ether content of 52.7%.

Example III

Two hundred and seventy parts of alpha-pinene, sixty parts of ethylene glycol, and six parts of sulfamic acid were refluxed for 70 hours at a reflux temperature which reached a maximum of 186° C. The reaction mixture was washed with water to remove the unreacted ethylene glycol and the water-washed reaction mixture distilled at a final bath temperature of 175° C. to remove the unreacted alpha-pinene. Analysis of the resulting product indicated a hydroxyl content of 3.4% or a yield of terpene ethers equal to 57.8%.

The products in accordance with this invention are ethers produced by the addition of an alcohol to an unsaturated terpene compound at a double bond of the terpene compound. When polyhydric alcohols are used, the ethers so produced may contain one or more unreacted hydroxyl groups derived from the polyhydric alcohol or it may contain a hydroxyl group of the terpinic group carried over from the original terpene compound reacted. Alternately, the ethers produced may contain one terpene group and two groups derived from a polyhydric alcohol or may contain two or more terpinic groups linked by ether linkages to one hydrocarbon chain derived from a polyhydric alcohol. Again the product may contain one terpinic group linked to one hydrocarbon chain derived from a polyhydric alcohol by two ether linkages.

It will be understood that a great number of ethers are produced by the combination of the various polyhydric alcohols with the various unsaturated terpene compounds in the various ways set forth in the examples and that all such compounds are included in the scope of this invention. Such ethers will be termed "additive" terpene ethers to distinguish from ethers produced by reaction involving a hydroxyl group of a terpene alcohol.

In the production of "additive" terpene ethers by the reaction of an unsaturated terpene with an alcohol in accordance with the method of this invention, the unsaturated terpene may be reacted with the alcohol to an extent such that the product shows no unsaturated characteristics. On the other hand, the product may show some unsaturation which may, if desired, be eliminated by contact with hydrogen in the presence of a hydrogenation catalyst such as, for example, platinum, palladium, nickel, etc. Thus, the hydrogenation of unsaturated "additive" terpene ethers may be effected by contacting the ether with 2% of an active supported nickel hydrogenation catalyst and hydrogen under a pressure of about 20 to about 250 atmospheres at a temperature within the range of about 75° C. to about 200° C. The terpene compound reacted by the method in accordance with this invention may be an unsaturated monocyclic terpene compound such as for example, dipentene, terpinene, terpinolene, or other unsaturated monocyclic terpene alcohols or mixtures thereof; it may be an unsaturated complex cyclic terpene capable of isomerization to an unsaturated monocyclic terpene compound which may be, for example, alpha-pinene, carene, etc., or it may be a bicyclic terpene which is not readily isomerized under the conditions of the reaction such as for example, nopinene, camphene, and bornylene.

These terpene compounds need not be in the form of pure compounds to be treated in accordance with this invention, but may be reacted in crude forms. Thus, in place of the several pure terpene compounds, crude natural mixtures of terpene compounds as, for example, turpentine, pine oil, etc., or mixtures of terpenes with petroleum or other saturated hydrocarbons may be used. Various fractions from these mixtures may also be used without the necessity of isolating the compounds in their pure state, after the etherification of a crude mixture of terpene compounds or a mixture of terpene compounds. The products may be separated from the unreacted components of the reaction mixture by fractional distillation, by extraction with a selective solvent for the ether or unreacted alcohol which is substantially immiscible with the reaction mixture, or by combination of these methods.

The polyhydric alcohols used to produce the "additive" terpene ethers in accordance with this invention may be, for example, ethylene glycol, propylene glycol, diglycol, trimethylene glycol, glycerol, mannitol, sorbitol, pentaerytherite, etc. Monohydric alcohols such as, for example, methyl alcohol, ethyl alcohol, normal propyl alcohol, isopropyl alcohol, normal butyl alcohol, secondary butyl alcohol, amyl alcohol, ethylene chlorohydrin, tetrahydro-furfuryl alcohol, benzyl alcohol, lauryl alcohol, stearyl alcohol, oleyl alcohol, abietyl alcohol, pimarol, hydrogenated abietyl alcohol, hydropimarol, the mono-ethyl, mono-butyl, monomethyl ether of polyhydric alcohols as ethylene or diethylene glycol, etc., or mixtures thereof may be reacted with terpene compounds, in accordance with the method of this invention, to produce "additive" terpene ethers.

The relative proportions of the alcohol and the terpene compound used in the reaction mixture will depend on the molecular weight of the alcohol. It is desirable to use not less than 1½ mols, and preferably at least 3 mols of the aliphatic alcohol per mol of the terpene compound.

The concentration of catalysts used in the reaction may be varied over a wide range. Thus, the amount of catalyst used calculated as sulfamic acid may be within the range of about 0.1% to about 25.0% of the weight of the alcohol contained in the reaction mixture. The preferred amount will depend on the particular alcohol and the particular terpene reacted. In general, however, it is preferable to have the catalyst present in amounts within the range of about 1% to about 10% by weight of the alcohol.

The temperature at which the reaction is carried out will depend largely upon the particular terpene and the particular alcohol used and may be varied over a range of about 30° C. to about 200° C. From the standpoint of yield, reaction velocity and operating simplicity it is generally preferable to maintain the temperature of the reaction mixture within the range of about 75° C. to about 150° C.

The time required for the reaction to take place will also vary with the terpene compound and the alcohol used. It may vary over a range of about 5 hours to about 100 hours. But, in general, the reaction takes place within 30–70 hours at ordinary pressures. A lesser time is required when the reaction is carried out under pressure.

The "additive" terpene ethers produced in accordance with this invention are useful as solvents and softeners in coating compositions and in printing inks.

What I claim and desire to protect by Letters Patent is:

1. The method of producing an additive terpene ether which comprises reacting an alcohol with an unsaturated terpene compound in the presence of sulfamic acid as catalyst.

2. The method of producing an additive terpene ether which comprises reacting an alcohol with a bicyclic terpene compound in the presence of sulfamic acid as catalyst.

3. The method of producing an additive terpene ether which comprises reacting an alcohol with a monocyclic terpene compound in the presence of sulfamic acid as catalyst.

4. The method of producing an additive terpene ether which comprises reacting monohydric alcohol with a bicyclic terpene compound in the presence of sulfamic acid as catalyst.

5. The method of producing an additive terpene ether which comprises reacting polyhydric alcohol with a bicyclic terpene compound in the presence of sulfamic acid as catalyst.

6. The method of producing an additive terpene ether which comprises reacting methanol with a bicyclic terpene compound in the presence of sulfamic acid as catalyst.

7. The method of producing an additive terpene ether which comprises reacting ethanol with a bicyclic terpene compound in the presence of sulfamic acid as catalyst.

8. The method of producing an additive terpene ether which comprises reacting an aliphatic glycol with a bicyclic terpene compound in the presence of sulfamic acid as catalyst.

9. The method of producing an additive terpene ether which comprises reacting ethylene glycol with a bicyclic terpene compound in the presence of sulfamic acid as catalyst.

10. The method of producing an additive terpene ether which comprises reacting an alcohol with pinene in the presence of sulfamic acid as catalyst.

11. The method of producing an additive terpene ether which comprises reacting monohydric alcohol with pinene in the presence of sulfamic acid as catalyst.

12. The method of producing an additive terpene ether which comprises reacting polyhydric alcohol with pinene in the presence of sulfamic acid as catalyst.

13. The method of producing an additive terpene ether which comprises reacting methanol with pinene in the presence of sulfamic acid as catalyst.

14. The method of producing an additive terpene ether which comprises reacting ethanol with pinene in the presence of sulfamic acid as catalyst.

15. The method of producing an additive terpene ether which comprises reacting an aliphatic glycol with pinene in the presence of sulfamic acid as catalyst.

16. The method of producing an additive terpene ether which comprises reacting ethylene glycol with pinene in the presence of sulfamic acid as catalyst.

17. The method of producing an additive terpene ether which comprises reacting methanol with alpha-pinene in the presence of sulfamic acid as catalyst.

18. The method of producing an additive terpene ether which comprises reacting ethanol with alpha-pinene in the presence of sulfamic acid as catalyst.

19. The method of producing an additive terpene ether which comprises reacting ethylene glycol with alpha-pinene in the presence of sulfamic acid as catalyst.

JOSEPH N. BORGLIN.